Sept. 28, 1943.         J. W. HOLT         2,330,285
WHEEL BODY FOR DUAL DEMOUNTABLE RIMS
Original Filed July 19, 1924    6 Sheets-Sheet 1
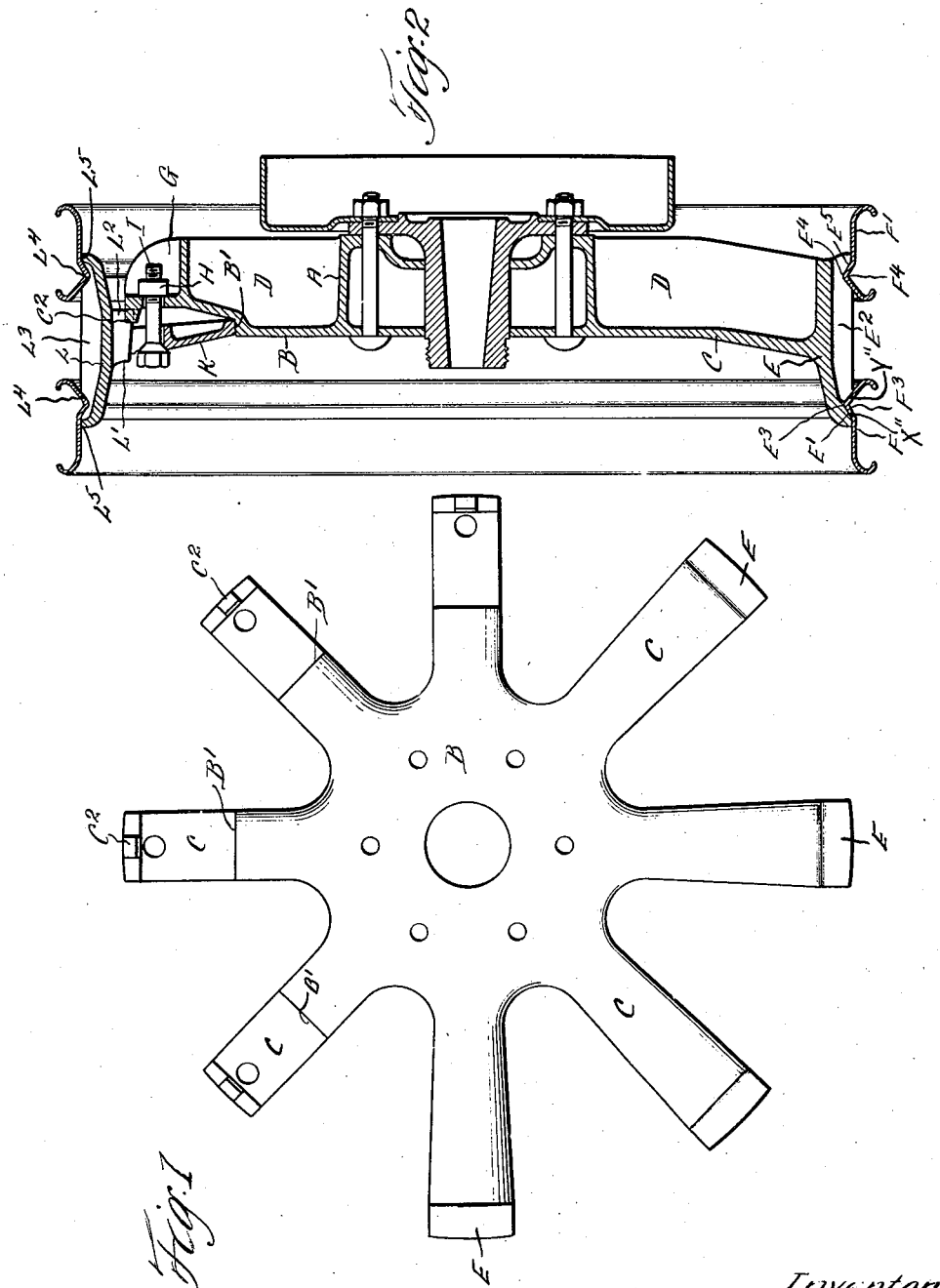

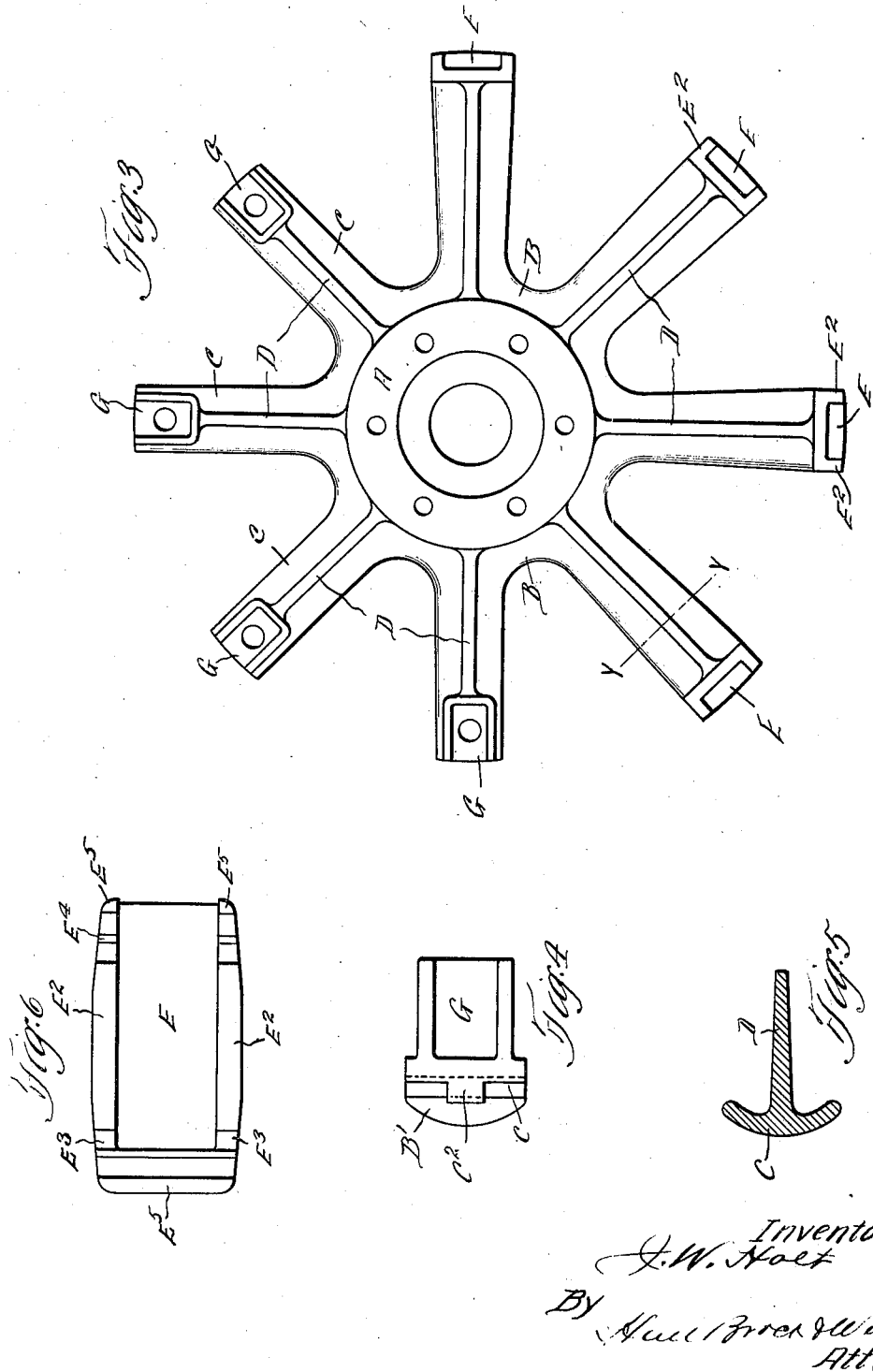

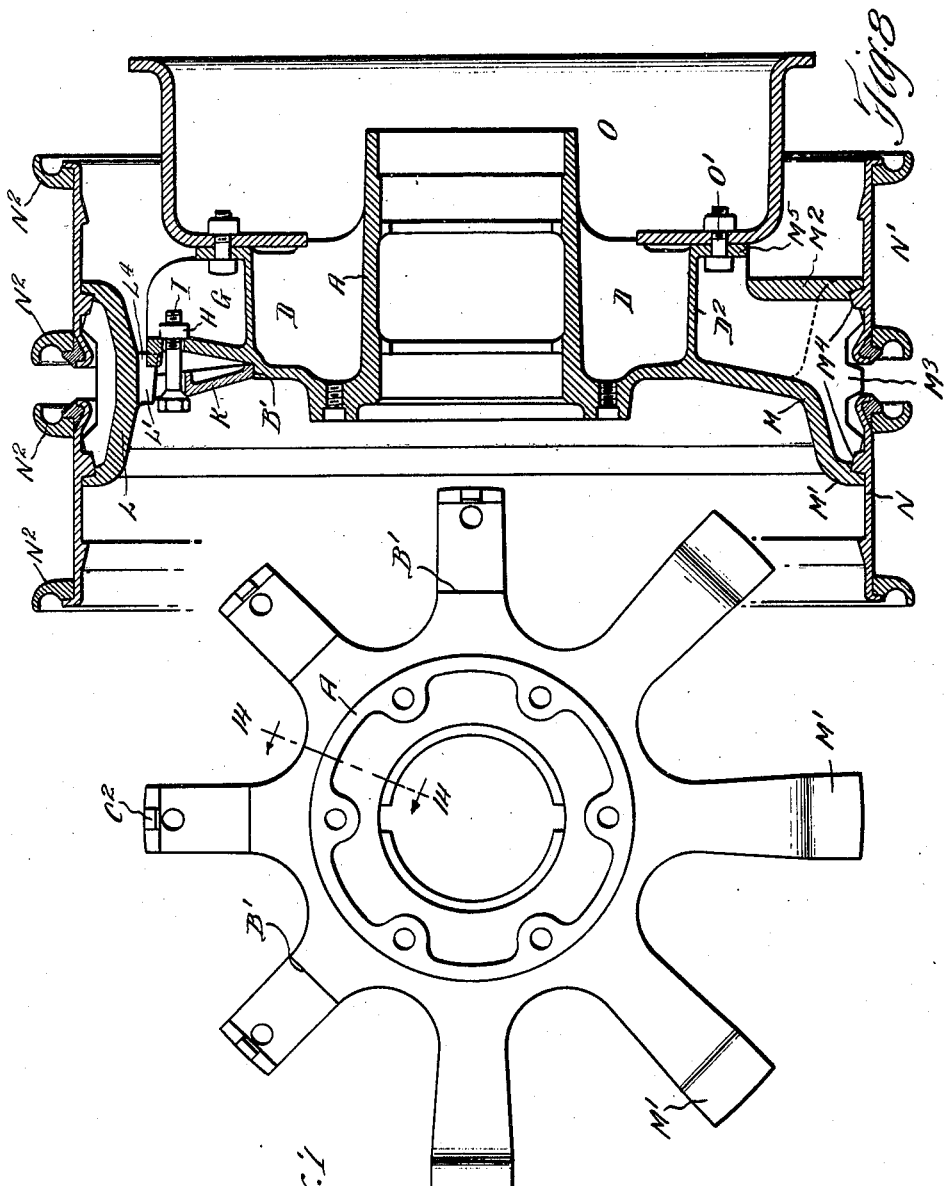

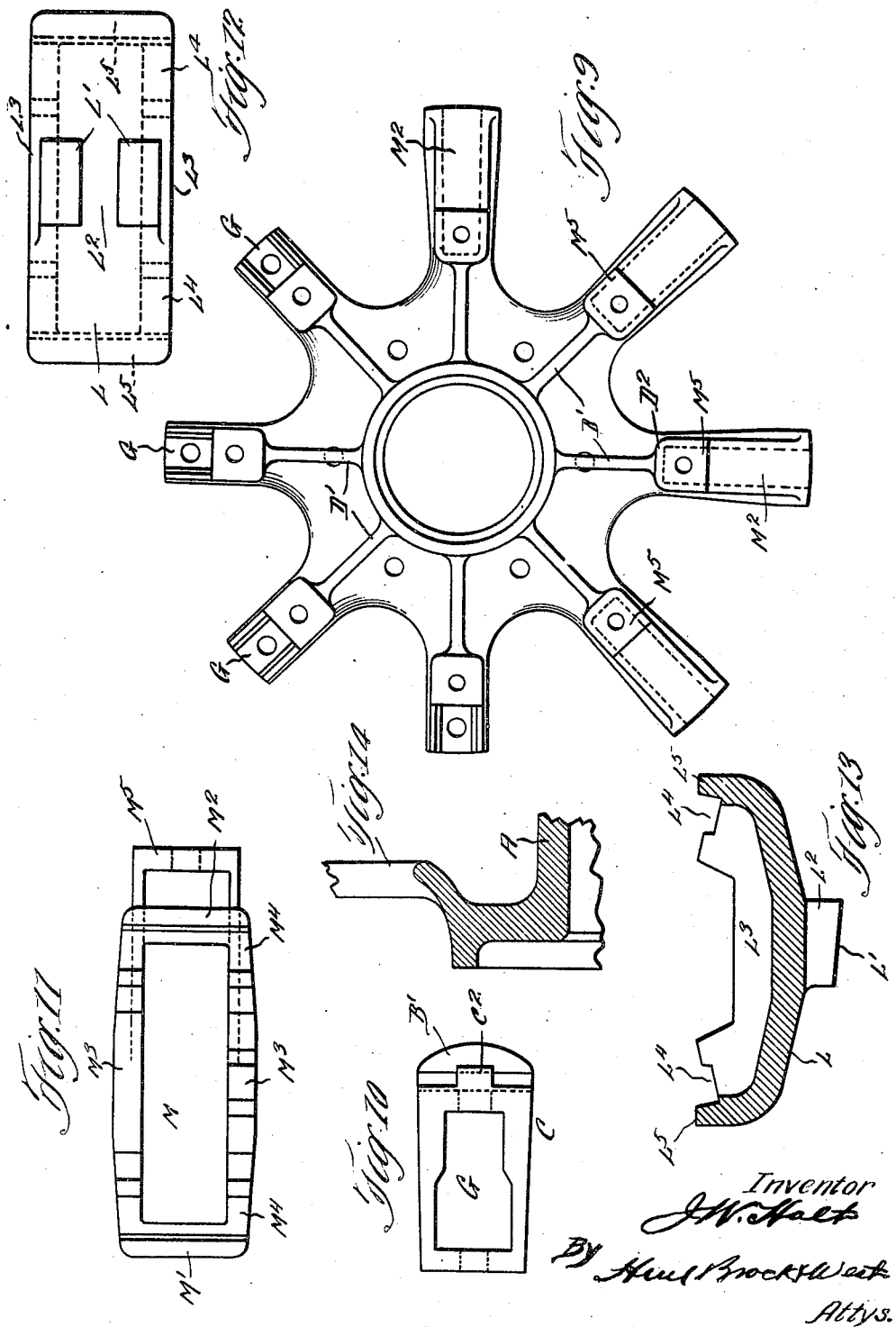

Sept. 28, 1943.   J. W. HOLT   2,330,285
WHEEL BODY FOR DUAL DEMOUNTABLE RIMS
Original Filed July 19, 1924   6 Sheets-Sheet 5
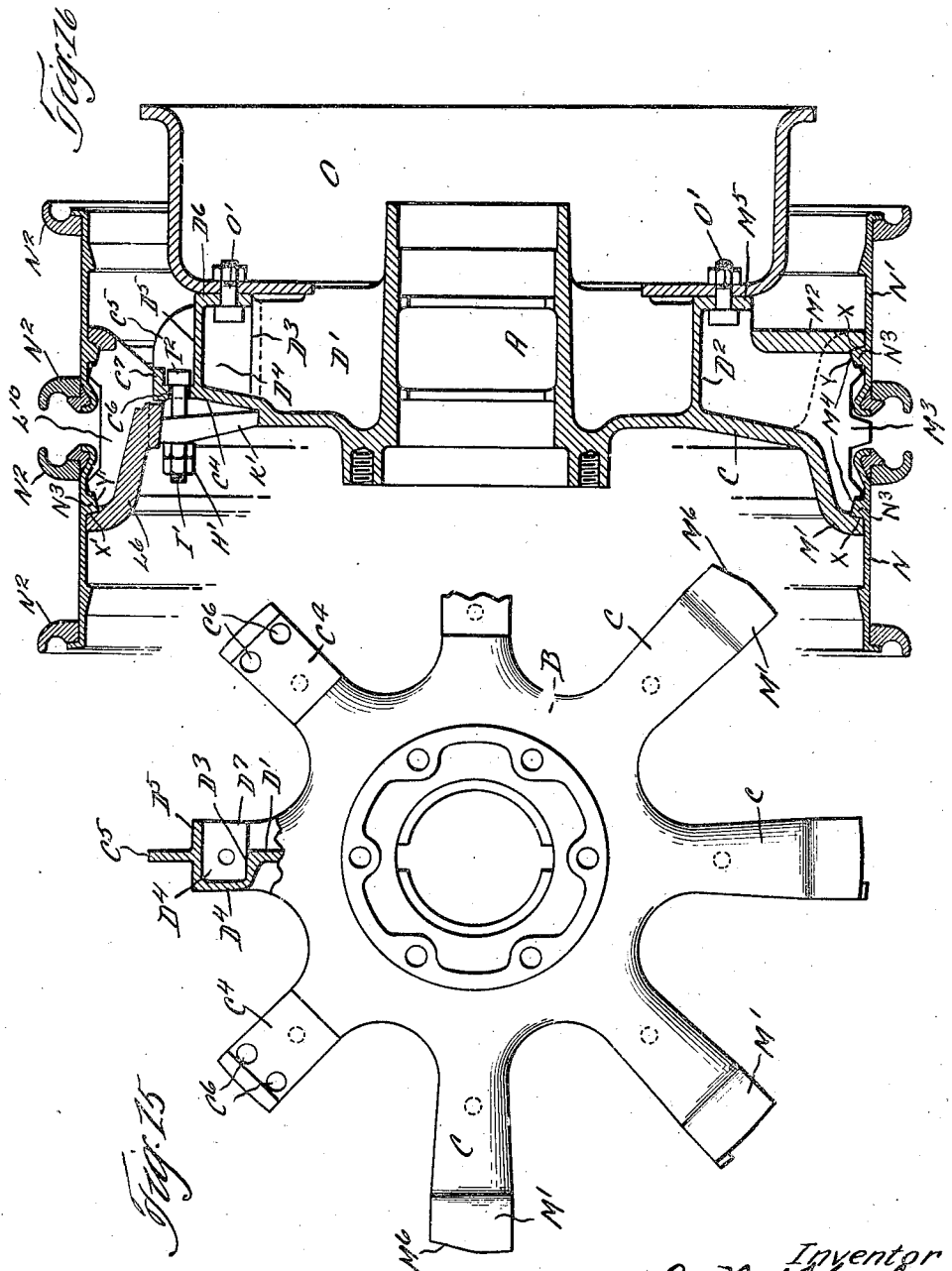

Sept. 28, 1943.   J. W. HOLT   2,330,285
WHEEL BODY FOR DUAL DEMOUNTABLE RIMS
Original Filed July 19, 1924   6 Sheets-Sheet 6
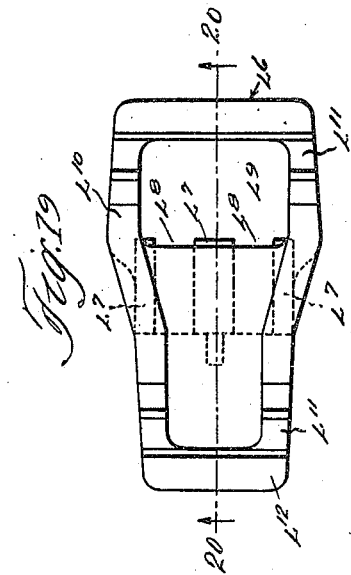
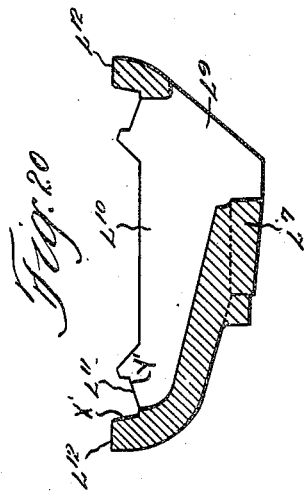
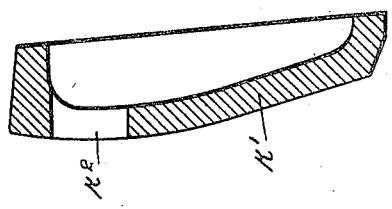
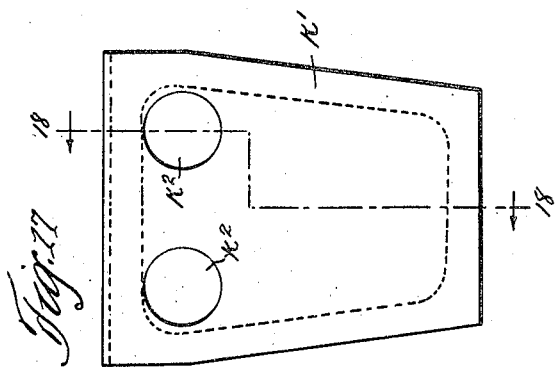
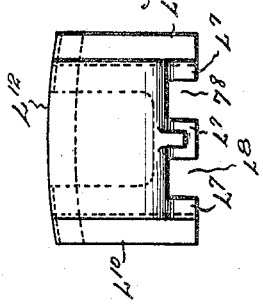
Inventor
J. W. Holt
By Hull, Brock & West
Attys.

Patented Sept. 28, 1943

2,330,285

UNITED STATES PATENT OFFICE 2,330,285

WHEEL BODY FOR DUAL DEMOUNTABLE RIMS

John W. Holt, Cleveland, Ohio, assignor, by mesne assignments, to Orrel A. Parker, Cleveland, Ohio Application July 19, 1924, Serial No. 726,909
Renewed May 8, 1931

13 Claims. (Cl. 301—12)

This invention relates generally to wheels and more particularly to a cast metal wheel intended for use upon motor vehicles and adapted to carry dual demountable tire carrying rims.

One object of the invention is to provide a wheel body upon which dual demountable tire carrying rims can be quickly and easily mounted and demounted; and it is also an object to provide a fastening means which will permit standard types of rims now in use to be used in dual form in connection with this wheel body.

Another object of the invention is to provide a wheel body for duals which shall be light, strong and durable, and a still further object is to provide a wheel body to which the brake drum can be conveniently attached.

With these various objects in view, and certain others which will become apparent as the description proceeds, the invention consists in the novel features of construction and in the manner of combining or arranging the same, all of which will be fully described hereinafter and set forth in the appended claims.

In the drawings forming part of this specification, Fig. 1 is a face view of a wheel body constructed in accordance with my invention, the rims and fastening means being removed therefrom; Fig. 2 is a vertical sectional view of this wheel body with the dual tire carrying rims arranged thereon together with means for securing said rims to the wheel body; Fig. 3 is a rear view of a wheel body shown in Fig. 1; Fig. 4 is an end view of one of the shorter spokes; Fig. 5 is a detail sectional view on the line Y—Y of Fig. 3; Fig. 6 is an end view of one of the longer spokes; Fig. 7 is a front view of a slightly modified form of wheel body made heavier to carry heavier loads; Fig. 8 is a sectional view of the same with dual rims thereon and brake drum attached; Fig. 9 is a rear view of the structure shown in Fig. 7; Fig. 10 is an end view of one of the shorter spokes; and Fig. 11 is an end view of one of the longer spokes; Fig. 12 is an inverted plan view of the shoe; Fig. 13 is a sectional view of the shoe; Fig. 14 is a detail sectional view on the line 14—14 of Fig. 7; Fig. 15 is a view similar to Fig. 1, showing still another form of wheel body; Fig. 16 is a vertical sectional view of the form shown in Fig. 15; Fig. 17 is a face view of one of the toggle levers; Fig. 18 is a sectional view taken on the line 18—18 of Fig. 17; Fig. 19 is a plan view of one of the shoes; Fig. 20 is a sectional view taken on the line 20—20 of Fig. 19; and Fig. 21 is an end view of the shoe looking from the left of Figs. 19 and 20.

In constructing a wheel body in accordance with my invention I provide a hub structure A, and a central disk-like portion B integral with the forward end thereof. Spoke-like arms or extensions C extend radially outwardly from the central disk-like portion B. Preferably, one half the number of spokes are somewhat shorter than the remainder, and where the shorter spokes and central disk-like portion meet, there is provided a shoulder or ledge B' the purpose of which will appear hereafter. The spokes and disk portion can be of any desired radial length.

Ribs D are integral with the hub A, disk-like portion B, and spoke-like extensions C, these ribs extending axially along the hub structure and are preferably arranged centrally with reference to the spokes, thereby serving as a brace and reinforcement for said disk and spoke portions.

The spoke portions may be flat, or they may be slightly curved as most clearly shown in Fig. 5.

At the outer end of each of the longer spokes there is formed an integral shoe E, this shoe extending axially both forwardly and rearwardly of the spoke C and comprises a front wall E' providing a rim seat or surface contact for one of the demountable rims.

The shoe is also provided with side walls $E^2$ which are notched at $E^3$ in order to receive the inwardly projecting bead $F^3$ of the outer demountable rim F in case the rim is so constructed. Notches $E^4$ are also produced in the side walls near the rear or inner ends thereof to receive the inwardly projecting bead $F^4$ of the inner dual rim F', and rim seats $E^5$ are also provided at the inner ends of the permanent shoes upon which the inner dual rim F' can seat. It will of course be understood that the ribs D are also integral with these permanent shoes. The shorter spokes are not provided with permanent shoes, but are formed with a rearwardly opening socket G in which is arranged the nut H into which screws the bolt I, said bolt passing freely through the toggle lever K, this toggle lever fulcruming at its inner end upon the offset or shoulder B'.

At its outer end this toggle lever is adapted to engage the detachable shoe L and force the same into engagement with the dual rims F and F' for the purpose of securing these rims upon the wheel body.

Each shoe L has an inwardly extending portion L', the inner face of which is beveled to correspond with the beveled outer end of the toggle lever K, and as this toggle lever is tightened up and caused to approach a position perpendicular to the axis of the wheel body, the shoe L is forced laterally inwardly and radially outwardly.

The inwardly extending portions L' are spaced apart as shown at L² to receive the outwardly projecting stop lug C² carried at the end of the spoke and serving to limit the circumferential movement of the shoe.

The shoe has side walls L³ notched at L⁴ to receive the inwardly projecting beads of the dual rims; and contact surfaces L⁵ are also provided for engagement with the bases of the rims.

In operation the wheel body is turned so as to bring the longer spokes uppermost and the dual rims are then hung upon the permanent shoes at the ends of the spokes and the opposite portions of said rims drop down so that the rims hang in parallel suspension, there being sufficient clearance between the ends of the shorter spokes and the rims.

The detachable shoes L are then placed in engagement with the dual rims and the spoke ends, the toggle levers K placed in position between the wheel body and the shoes and the nuts and the bolts are then tightened up, tending to bring the toggle levers inwardly and forcing the shoes both laterally inwardly against the face of the spoke and radially outwardly, tensioning the dual rims and drawing them tightly upon the permanent shoes. In this manner the dual rims are securely fastened upon the wheel body.

The mounting operation, it will thus be seen, is simple and easy and can be accomplished in a very short space of time. The demounting operation, carried out in the reverse manner, can be accomplished with equal ease and expedition and in releasing the toggles it has been found that as they move away from the wheel body the shoes move with them to a certain extent, and in this manner the tension and contacts are broken, so that the rims can be quickly and easily lifted off and all binding or freezing entirely prevented.

In the construction shown in Figs. 7, 8 and 9 the general features of construction are substantially the same but this wheel body is intended for heavier loads than the wheel body shown in Figs. 1 and 2 and consequently the parts are made heavy, that is to say, the hub structure is somewhat deeper axially and likewise the reinforcing ribs.

The permanent shoes M, have each a front wall M', a rear wall M², and side walls M³ notched at M⁴. The front and rear walls of these permanent shoes furnish rim contacts for the demountable rims N and N' which, it will be noted, are shown provided with detachable flange rings N² upon opposite sides, but it will of course be understood that any type of rim can be employed and the surface contacts of both the permanent shoes and the detachable shoes will of course be shaped according to the necessities of the case.

In addition to the inner wall M² there is also provided a wall M⁵ to which the outer face of the brake drum O is secured by means of bolts O'. It will be noted by reference to Fig. 9 that the ribs D' are divided as indicated at D², the bifurcations extending along to the ends of the spokes and the inner wall M² of the shoe and also rear wall M⁵ are integral with the bifurcated portions of these ribs. The operations of the shoes, toggles, bolts, etc., are exactly the same as previously described, the permanent and detachable shoes being made somewhat larger and heavier and the other parts being correspondingly increased in dimensions to carry the loads and withstand the strains.

The attachment of the brake drum is also conveniently accomplished. Instead of arranging the nuts in the peripheral sockets and passing the bolt through the toggle levers and spoke end from the outside, I may place the head of the bolt in the peripheral socket, passing the threaded end outwardly from the inside and arranging the nut upon the outer end of bolt and upon the outer face of the toggle lever; and in practice I prefer to use two nuts one of which acts as a jam or lock nut.

In the construction shown in Figs. 15–21 inclusive, the general features of construction are substantially the same as those illustrated in Figs. 7, 8 and 9.

The construction of the longer spokes and the manner of attaching the brake drum is identical with that shown in Figs. 7, 8 and 9 and the same reference characters are used thereon.

The two long spokes adjacent the shorter spokes have their front and rear walls M' and M² beveled as indicated at M⁶ to facilitate mounting and demounting of the rims.

The shorter spokes have the same ledge B' for the same purpose as the forms previously described, but the outer ends of these spokes are formed somewhat differently as will now be described.

The rib D' is offset to the left at D³, then outwardly at D⁴ and then to the right and extends clear across the spoke as indicated at D⁵.

This together with a rear wall D⁶ forms a chamber, which is open at one side, D⁷, and allows the inserting of the brake drum fastening bolts O' through the aperture in the rear wall D⁶.

Cast integrally with the front wall C⁴, of the spoke, and the wall D⁵ and extending rearwardly and outwardly from the last mentioned parts is a rib C⁵.

The front wall C⁴ has apertures C⁶, on each side of the ribs C⁵, through which bolts I' are inserted.

The bolts I' are held from turning by their head I² engaging the rib C⁵, wall D⁵ and an overhanging shoulder C⁷ which extends rearwardly from the rear of the front wall C⁴ and outwardly from each side of the rib C⁵.

The toggle lever K' is somewhat wider than the toggle lever K previously described and has two holes K² therein through which the bolts I' are inserted. By drawing up nuts H' on the bolts I' the toggle lever K' is drawn inwardly, thus forcing the shoe L⁶ into engagement with the rims N and N' which secures the rims to the wheel body in the manner previously described in the preceding forms.

Each shoe L⁶ has an inwardly extending portion L⁷, the inner face of which is beveled to correspond with the beveled outer end of the toggle lever K', and as stated before, when the toggle lever is tightened up and caused to approach a position perpendicular to the axis of the wheel body, the shoe is forced laterally inwardly and radially outwardly.

The rear face of the inwardly projecting lug is recessed as shown at L⁸, to allow it to straddle the bolts I' when assembling, and the rear wall of the shoe is cut away as shown at L⁹ to allow the shoe to straddle the end of the spoke which serves to limit the circumferential movement of the same.

The shoe has side walls L¹⁰ notched at L¹¹ to receive the inwardly projecting beads of the dual rims; and contact surfaces $L^{12}$ are also provided for engagement with the bases of the rims.

From the foregoing, it will be clear that the alignment of the rims in parallel planes perpendicular to the axis of the wheel is accomplished, in the different embodiments illustrated herein, for instance in Fig 2, by positioning the two rims upon the long spokes with the tapered beads $F^3$ and $F^4$ at one edge of each rim engaging the cooperating notches $E^3$ and $E^4$ in the spoke ends. When so positioned, these notches on the different spoke ends each comprise segments of an arc of a circle, lying in a plane perpendicular to the axis of the wheel.

For instance referring to Fig. 16, the four longer spokes have notches $M^4$, each of which is made up of two major tapered surfaces X and Y, shaped to receive the larger bead $N^3$ on the rims N and N'. The rim is mounted upon the wheel with the longer spokes in the uppermost position.

The weight of the tire and rim causes the tapered surface of the bead $N^3$ to contact with the tapered bottom Y of the notch $M^4$ and slides until the side of the bead $N^3$ seats against the tapered side X of the notch $M^4$. This initially positions the rim in alignment with a plane perpendicular to the axis of the wheel. After the two rims are hanging upon the wheel supported by the tapered beads, the shoe $L^6$ is placed upon the beads and against each shorter spoke, the shoe $L^6$ being notched at $L^{11}$, Fig. 20, in the same manner as the permanent shoe on the long spoke. The notches designed to receive the large bead $N^3$ have two main tapered surfaces X' and Y', Figs. 16 and 20.

When the toggle K exerts pressure upon the shoe $L^6$ the tapered bead $N^3$ and the bottom of the notch Y are forced together until the bead $N^3$ abuts against the side X of the notch. The shoe $L^6$ is, of course, made so that the projection $L^7$ contacts with the front of the shorter spoke when thus tensioning the rims in alignment in a plane perpendicular to the axis of the wheel.

In the case of the embodiment illustrated in Fig. 2, the bead of the rim $F^3$ and $F^4$ slides on one or the other of the inclined surfaces X'' and Y'' of the notch to provide initial alignment accomplished by the weight of the tire and rim in the same manner as described for the embodiment of Fig. 16, and in the same manner the shoe L clamps the parts in a manner so as to tension the rim in an aligned position.

The various parts can of course be modified and changed somewhat to meet changes in rim structures without departing from the broad principle of my invention which covers the quick and easy mounting and demounting standard duals upon or from a wheel body comprising a plurality of full size spokes and detachable shoes used in combination with the shorter spokes and toggle levers for actuating the same.

Having thus described my invention, what I claim is:

1. The combination with a wheel body having rim seats at definite points, of a plurality of demountable rims contacting with said rim seats, shoes having rim seats interposed between the wheel body and rims and contacting with said rims, said shoes having inwardly projecting bevel faced lugs and toggle levers engaging the said lugs and wheel body, and means for moving said levers to bind said rims upon said wheel body and shoes.

2. The combination with a wheel body having rim seats at definite points, of a plurality of rims arranged about said wheel body and contacting with said rim seats, shoes having rim seats interposed between said rims and wheel body at points where said rims are out of contact with said wheel body, said shoes having each an inwardly extending bevel faced lug the inner face of said lug being recessed, toggle levers engaging said shoe lugs and wheel body, and means for moving said lugs to tension said rims and bind the same upon the wheel body and shoes, said wheel body having stop lugs adapted to limit the inward lateral movement of said shoes and rims.

3. The combination with a wheel body comprising a hub having integral face portions, said face portions having a plurality of fulcrum seats at definite points intermediate the hub and periphery, the radii of the face portions provided with said seats being less than the radii of the other portions; of a demountable tire carrying rim arranged upon said wheel body and seating upon the portions of greater radius, shoes arranged opposite the seat carrying portions, levers bearing upon said seats and engaging said shoes, and means for moving said levers to force said shoes radially outwardly and fastening the rim upon the wheel body.

4. The combination with a wheel body comprising a central portion and a plurality of spokes radiating therefrom, the spokes upon one side being shorter than those on the opposite side, of a pair of demountable tire carrying rims seating directly upon the ends of the longer spokes, shoes interposed between said rims and the short spokes, and means for moving said shoes into engagement with said short spokes and rims whereby the rims are positioned and tensioned upon the wheel body.

5. The combination with a wheel body comprising a central portion and a plurality of spokes radiating therefrom, the spokes upon one side being shorter than those on the opposite side, of a pair of demountable tire carrying rims seating upon the ends of longer spokes and shoes between said rims and shorter spokes and means carried by said wheel body for moving said shoes into locked engagement and whereby the rims are tensioned upon the wheel body.

6. The combination with a wheel body comprising a central portion and a plurality of spokes radiating therefrom, the spokes upon one side being shorter than those on the opposite side, of a pair of demountable tire carrying rims seating upon the longer spokes, the shorter spokes being short enough to permit the inner rim to be removed, shoes between the shorter spokes and rims, and means for moving said shoes into engagement with said rims and spokes and whereby said rims are tensioned.

7. The combination with a wheel body comprising a central portion and a plurality of spokes radiating therefrom, the spokes on one side being shorter than those on the opposite side, of a pair of demountable tire carrying rims seating upon the outer ends of the longer spokes, shoes interposed between the ends of the shorter spokes and the rims, toggle levers fulcrumed upon the outer face of the wheel body and engaging the shoes and means for moving said toggle levers to force the shoes into engagement with the rims and spokes, whereby the rims are tensioned.

8. The combination with a wheel body having upon one side thereof spaced rim seats, the other side of said wheel body being devoid of rim seats, of a pair of demountable rims positioned upon said seats, shoes interposed between the rims and those portions of the wheel body devoid of rim seats, and toggle levers arranged upon the outer face of the wheel body together with means for moving said toggle levers into engagement with the shoes for moving said shoes and tensioning the rims upon the wheel body.

9. The combination with a wheel body having upon one side thereof spaced rim seats, the other side of said wheel body being devoid of rim seats, of a demountable tire carrying rim positioned upon said rim seats, a plurality of shoes engaging the inner face of said rim at definite points, fulcrum seats arranged at definite points between the center and periphery of the wheel body, clamping levers fulcrumed on said seats and engaging said shoes to move the same radially outwardly and laterally inwardly, together with means for moving said clamping levers.

10. The combination with a wheel body comprising a hub, a central portion and spokes radiating therefrom, the spokes upon one side being shorter than the spokes upon the opposite side of the wheel body, and fulcrum shoulders upon the outer face of said short spokes, of a demountable tire carrying rim positioned upon the ends of the longer spokes, shoes engaging said rim and toggle levers fulcrumed upon the shoulders and engaging said shoes together with means for moving said levers.

11. A wheel structure comprising a spider, some of the arms of which have a laterally disposed seat therein spaced from their outer ends, a laterally movable wedge member positoned adjustably upon each of said seats, a jaw in each of said arms guided therein so as to admit of adjustable radial movement therein respecting the wheel structure and controlled by the corresponding wedge, and a wheel rim the inner peripheral portion of which has interlocking connection with said jaws at the outer ends thereof.

12. A wheel structure comprising a spider having radially disposed arms, a radially movable jaw in each of several of said arms, a wedge member in each of said several arms including means for laterally adjusting said wedge member therein and being operable to move and hold the corresponding jaw in adjusted positions, and a wheel rim, the inner peripheral portion of which is seated in the outer ends of said jaws, said jaws having aligned depressions therein for the reception of said inner peripheral portion.

13. The combination with a wheel body comprising a spider affording a plurality of wheel spokes, at least some of said spokes being each provided at their outer ends with a rim seat, a first rim making seating engagement with said rim seats, rim tensioning means comprising wedges adjustably mounted on sides of other of said spokes, bolt clamping means for moving said wedges laterally inwardly of said spoke ends, said wedges laterally movable responsive to operation of said bolt means to secure said rim under rim expanding pressure in engagement with said seats, said seats being disposed in alignment in a plane at right angles to the axis of said body, and a second rim carried by said wheel spokes laterally of said first rim and parallel therewith and simultaneously secured on said spokes under the same rim expanding movement of said wedges.

JOHN W. HOLT.